May 15, 1923.
C. J. McCORD
WHEEL
Filed Dec. 30, 1921
1,455,637
2 Sheets-Sheet 2
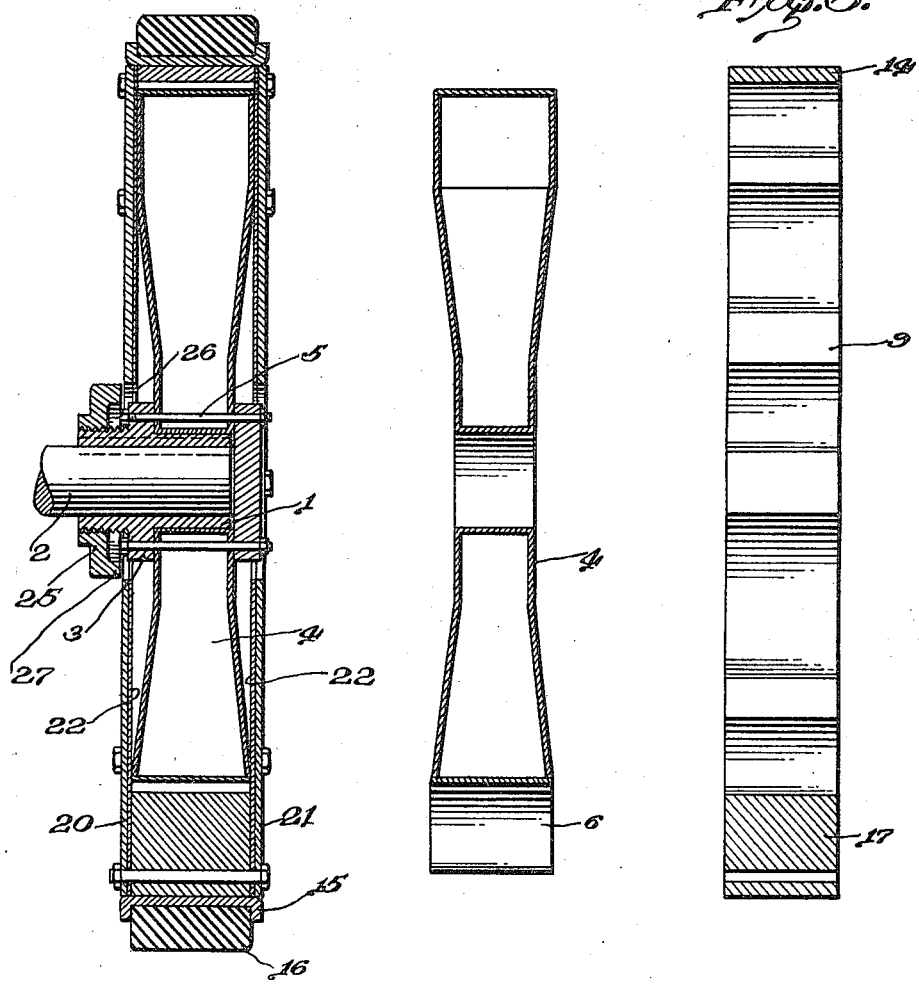

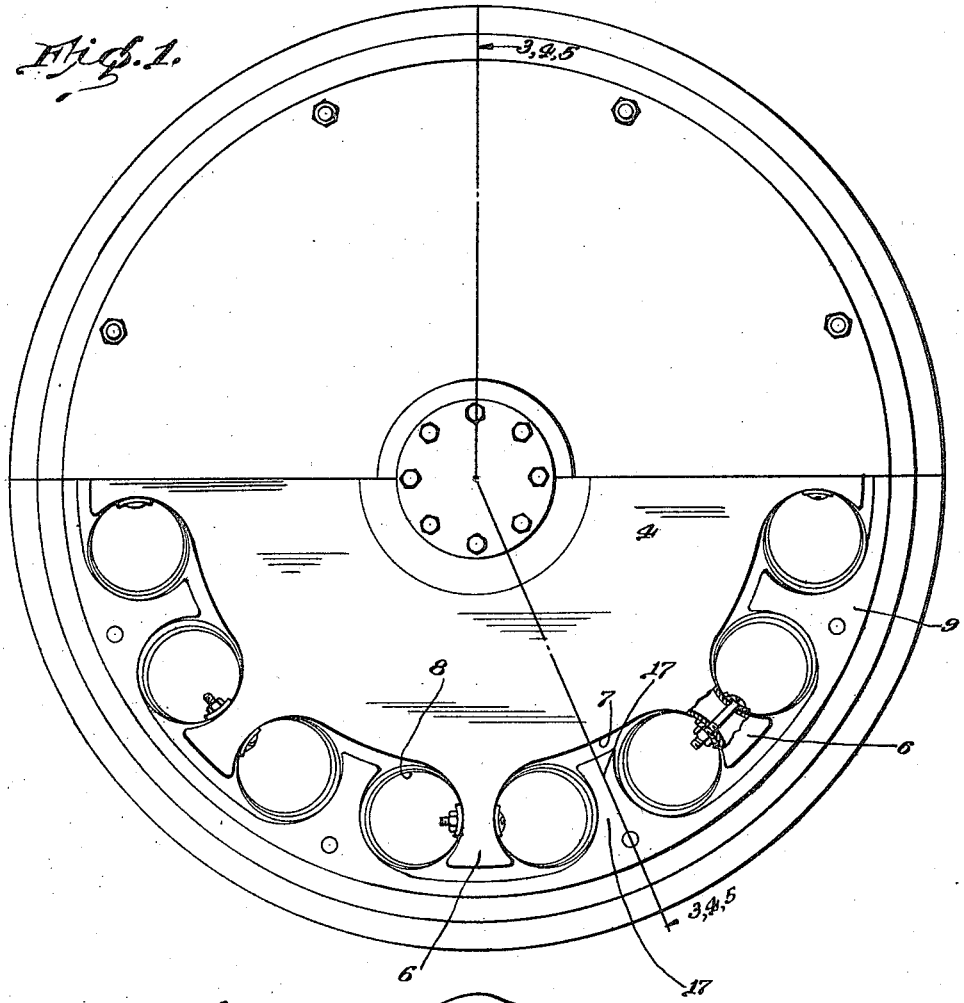
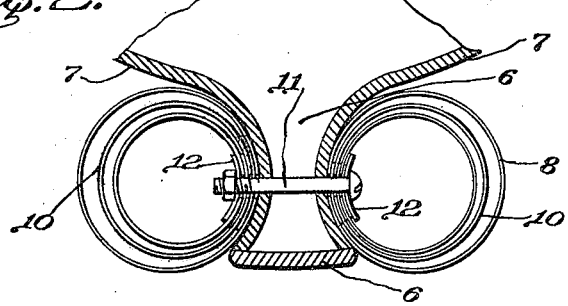

Patented May 15, 1923.

1,455,637

UNITED STATES PATENT OFFICE.

CHARLES JUDSON McCORD, OF ALPHA, MICHIGAN.

WHEEL.

Application filed December 30, 1921. Serial No. 526,012.

*To all whom it may concern:*

Be it known that I, CHARLES JUDSON MC-CORD, a citizen of the United States, residing at Alpha, in the county of Iron and State of Michigan, have invented new and useful Improvements in Wheels, of which the following is a specification.

This invention relates to wheels of the resilient shock absorbing type and among the objects of the invention is to provide a resilient wheel embodying a plurality of convolute, circumferentially spaced springs maintaining resilient connection between a hub and felly portion which springs are arranged to be subjected only to compression thrust, eliminating the subjecting of the springs to alternate tensioning and compression strain, or twisting, thereby materially increasing the longevity of the resilient wheel structure.

Another object of the invention is to mount the springs in sets, each set comprising a plurality of single coil springs having one end attached to the hub portion and the other end free to permit the compressing shock absorbing actions of the springs without weakening them, and by providing the multiple springs of each set the breaking of one spring of the set will not prevent the set from functioning in that the shocks will be absorbed by the remaining springs in the set.

Other objects of the invention will appear in the following description taken in connection with the accompanying drawings wherein:

Fig. 1 is a view partly in side elevation and partly in section of the improved wheel.

Fig. 2 is an enlarged sectional view illustrating the construction of the springs and their manner of mounting.

Fig. 3 is a cross sectional view through the entire wheel taken on line 3—3 of Fig. 1.

Fig. 4 is a detailed cross sectional view taken on line 4—4 of Fig. 1 but showing only the hub structure.

Fig. 5 is a detailed cross sectional view through the felly or rim structure and taken on line 5—5 of Fig. 1.

Referring more particularly to the drawing, the wheel comprises the hub section including the hub proper 1, which receives the axle spindle 2 therein and to the annular flanges 3 of which hub 1, the hub or spider body 4 is attached by suitable bolts 5. The hub spider 4 is constructed of any suitable material and is provided with a plurality of radial driving spokes 6 having concave sides, forming pockets 7 between adjacent spokes in which pockets are seated sets 8 of coil springs to provide resilient connection between the hub or spider 4 and the rim or felly structure 9. Each set 8 of springs comprises a plurality of single coils each arranged one within the other, as clearly shown in Fig. 2 of the drawings. The springs 10 of the sets are attached to the adjacent concave sides of the spokes 6 by suitable attaching bolts 11 and clamping plates 12. The bolts 11 extend through one end of each of the springs 10 in the sets 8, leaving other ends of the springs free from positive connection with the spokes, which free ends are held in place by the clamping plates 12. The multiple springs, in each set, receive and absorb the shocks incidental to the travel of the wheel or strain in ratio to its intensity. The weight of the vehicle body upon which the springs are mounted just puts the outside springs of each set into action thus conditioning the springs to receive and absorb the slightest shock that may occur. When the strain or shock is intensified or becomes greater the second or intermediate spring is employed, and upon still greater strain the innermost spring is employed, the three co-acting to absorb the shock. While in the drawings only three springs are shown in each set, it is to be understood that any desired number of single coil springs may be employed without departing from the spirit of this invention, and depending upon the weight of the vehicle, strength of the springs and other conditions which may arise in practical use.

The felly 9 comprises a circular band 14, to which any approved type of rim 15 may be attached, for supporting and cushioning the tire 16 of any approved form. The continuous band 14 of the felly 9 is provided with a plurality of inwardly extending radial, circumferentially spaced buttresses 17, the sides of which are concaved, presenting concave surfaces towards the concave surfaces of the drive spokes 6, consequently confining the sets 8 of springs within the circular pockets, as clearly shown in Fig. 1 of the drawings. Under normal conditions the inner ends of the buttresses 17 and the outer ends of the drive spokes 6 are spaced relative to the inner walls of the pockets 7 and the inner surfaces of the felly 14 respectively, to permit the exercise of the shock absorbing proclivities of the springs. However, these buttresses and spokes are adapted, upon the application of excessive strain to the wheel, to engage the hub spider 4 and inner surface of the felly 9 respectively, to limit the compression of the springs. In all cases where a single spring is attached to both the hub and rim, the compression limit of the spring is not fixed and controlled which often results in the breaking of the spring owing to the fact that it is subjected to strain or shock beyond its capacity. In the present construction the springs are never called upon to withstand strain or shock greater than they can stand without breaking or deforming them and thus the longevity and effectiveness of the present wheel are increased.

Metal discs 20 and 21 are attached to the felly structure 9, preferably at the buttresses 17 and extend inwardly substantially to the hub 1 forming dust guards to prevent dust, mud, or other foreign matter from entering the wheel structure and impair its efficiency. These dust guards are enhanced by compressible discs 22 which are spaced against the inner surface of the metal discs 20.

At times, it is desirable to provide a solid or rigid connection between the hub and felly portions of the wheel rendering the springs inactive, and I, therefore, provide a lock structure including a collar 25 mounted upon the hub 1 and adapted to be threaded along the hub to enter the central opening 26 of the disc 20. The locking collar 25 is provided with a laterally extending annular flange 27 which engages over the perimeter of the annular flange 3 on the hub. Thus a rigid connection is established between the disc 20, locking collar 25 and hub 1 preventing relative movement of the felly structure, which is connected to the discs 20 and 21, and the hub structure, thereby providing a rigid wheel structure in lieu of the resilient wheel structure provided by the resilient, yieldable connection between the hub structure and felly structure which is permitted by the sets 8 of the springs.

It is, of course, to be understood that the invention may be constructed in various other manners and the parts associated in other relations and, therefore, I do not desire to be limited in any manner except as set forth in the claims hereunto appended.

Having thus described my invention what I claim is:

1. In a wheel, a hub, radial drive spokes on said hub, a felly movable relative to the hub, sets of convolute springs disposed concentrically of the axis of the hub and carried by said drive spokes, and buttresses on said felly engaging said springs to establish resilient connection between the hub and felly and co-acting with said hub for limiting compression of the springs, the springs in said sets each comprising one convolution and having one end attached to said spokes and the other end free.

2. In a wheel, a hub, a felly movable relative to the hub, radial driving spokes on said hub, sets of convolute springs disposed concentrically of the axis of the hub, means attaching said sets of springs to said spokes, and means on said felly engaging said springs to establish resilient connection between the hub and felly, the springs in said sets each comprising one convolution and having one end attached to said hub and the other end free.

3. In a wheel, a hub, radial drive spokes on said hub forming pockets between adjacent spokes, a plurality of sets of convolute springs in each pocket, a felly, buttresses on said felly engaging between the sets of springs in each pocket to establish resilient connection between the hub and felly, said spokes and buttresses presenting concave surfaces to the sets of springs for snugly fitting the outermost springs in the sets, the springs in said sets each comprising one convolution and having one end attached to said spokes and the other end free.

4. In a wheel, a hub, a felly movable relative to the hub, sets of convolute springs disposed in a circle concentrically of the axis of the hub and carried thereon, said sets of springs each comprising a plurality of springs of different diameter and positioned one within the other in eccentric relation, each of said springs comprising one convolution and having one end attached and the other end free.

5. In a wheel, a hub, radial drive spokes on said hub forming pockets between adjacent spokes, sets of springs in each pocket, a felly, buttresses on said felly engaging between the sets of springs in each pocket to establish resilient connection between the hub and felly, the springs in said sets each having one end attached to said spokes and the other end free.

6. In a wheel, a hub, radial drive spokes on said hub forming pockets between adjacent spokes, sets of springs in each pocket, a felly, buttresses on said felly engaging between the sets of springs in each pocket to establish resilient connection between the hub and felly, the springs in said sets each having one end attached to said spokes and the other end free, and discs attached to the felly and extending inwardly for forming dust proof enclosures for said springs.

In testimony whereof I affix my signature.

CHARLES JUDSON McCORD.